H Ames,
Making Ordnance,
No. 1882. Reissued Feb. 28, 1865.
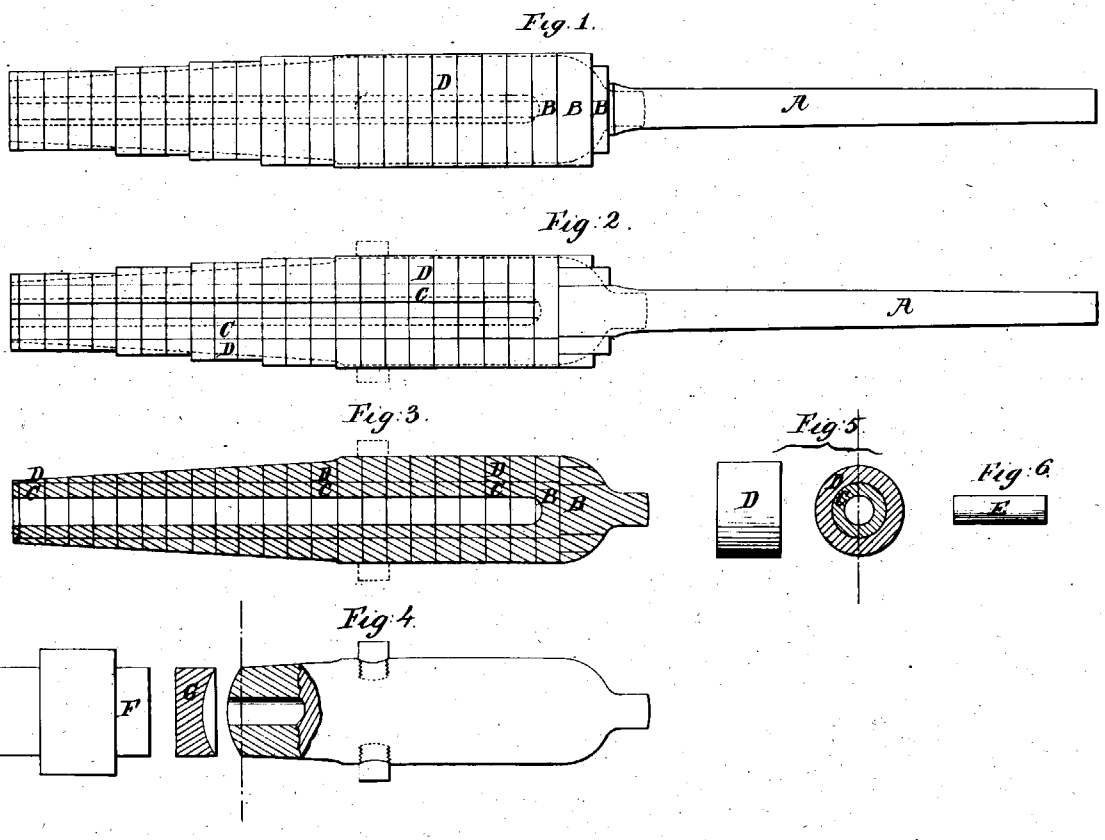
Witnesses;
Jno. C. Patten.
A. Morse
Inventor;
Per. Horatio Ames.
A. B. Stoughton Atty.

UNITED STATES PATENT OFFICE.

HORATIO AMES, OF FALLS VILLAGE, CONNECTICUT.

IMPROVEMENT IN THE MANUFACTURE OF WROUGHT CANNONS.

Specification forming part of Letters Patent No. 43,825, dated August 16, 1864; Reissue No. 1,882, dated February 28, 1865.

*To all whom it may concern:*

Be it known that I, HORATIO AMES, of Falls Village, in the county of Litchfield and State of Connecticut, have made an invention of an Improved Method of Constructing Ordnance or Cannon of Wrought-Iron; and I do hereby declare that the nature of the said invention and the manner in which it is to be performed is fully described in the following specification and represented in the accompanying drawings, of which—

Figure 1 denotes a side view, and Fig. 2 a longitudinal section through the same, the porter-bar in each figure still remaining attached to the gun or gun-block, and the welding and other lines still shown. Fig. 3 represents a longitudinal section through the gun as it appears when finished, the light lines representing the lines of welding by which the gun is made. Fig. 4 represents a gun partially complete and partially in section, to illustrate the manner in which the welding may be done or carried on. Fig. 5 represents a side and end view of one of the sections of concentric rings of which the gun is composed. Fig. 6 represents a centralizing or centering pin for guiding and directing the sections as they are placed for welding to keep the bore in a direct line or as nearly central as practical.

Similar letters of reference, where they occur in the separate drawings, denote like parts in all cases.

In the manufacture of wrought-iron guns previous to my invention no positive, certain, or reliable means of welding the sections together had been discovered, and hence this kind of gun or cannon had failed to come into use. Turning my attention to this object and purpose, I discovered the difficulties and uncertainties of the hitherto practiced plans of procedure, and after much thought and experiment I have succeeded in producing a wrougt-iron cannon which, if not entirely perfect, after many of the most severe tests, is at least so far perfect as that no fault of even the minutest character has as yet been found to exist in it.

My invention consists, first, in turning or planing the contact-surfaces of the concentric rings of which the gun sections are composed so as to make said surfaces clean and free from all scale or impurity, and thus insure perfect welding of the rings, one upon and against the other or to the next adjacent one.

My invention further consists in so shaping one of the end surfaces that is to be welded to the next adjacent end surface as that the two shall come in contact first at or near the bore of the gun, and be welded from this central position toward the periphery of the gun.

My invention further consists, as an auxiliary in the matching and correctly placing of the gun sections, so as so keep the central opening as nearly straight as possible, in the use of a portable and removable pin, by which the sections are matched and held until the welding is begun and then withdrawn; and, finally, my invention consists in a wrought-iron cannon composed mainly of a series of concentric rings that are lap-and-butt welded together, as will be hereinafter described.

To enable others skilled in the art to make and use my invention, I will proceed to describe the same with reference to the drawings.

I first take a porter-bar, A, to which is welded a series of solid plates, B, until enough solid metal is massed to form the breech of the cannon. These plates, to insure perfect welding, should be turned, planed, or cleaned so as to remove all scale from the surfaces to be welded together, and one of the contact-surfaces may be slightly convex, so that the welding may commence at the center and continue gradually toward the perimeter, and thus work out all or any scale or impurities that might otherwise prevent perfect welding. The turning or planing of the surfaces that are to be welded together, so as to remove the scale from the iron, besides its advantages in making a thorough weld, enables the workman to detect any flaws or imperfections in the iron and to reject such pieces as might otherwise escape his attention as imperfect.

Enough metal having been massed and welded to form the breech of the gun, I then commence with the rings as follows: I take two (or more) rings, C D, of suitable length, and of such diameter of bore and thickness of metal as that when the outside of the inner ring, *c*, and the inside of the outer ring, D, are turned, planed, or otherwise cleaned to rid them of the scale, and to examine the integrity of the metal and its clearness from all imperfections, the inner one will snugly enter the outer one. The ends of the concentric rings should also be planed, turned, or cleaned to rid the metal of the scale, and for further examining into the quality of the metal, to see that there are no flaws, cracks, or other imperfections. The hole in the inner ring, C, being bored or drilled out, is by this operation cleaned, so that any further turning or planing of that portion is unnecessary, it not being welded to any other surface, and the boring out clearly shows the quality of the metal and its freeness from flaws. The sections thus composed of the concentric rings are heated one at a time and welded to the preceding plates and rings until the desired length of gun is attained.

The heating of the ring and the heating of the partially-formed gun, so that the two may be welded together, is as follows: Two fires or furnaces are used, and the front of the partially-made gun is heated in one furnace and the section to be welded to it in the other. The two faces or surfaces to be welded together are exposed only to the densest of the fire, both being placed in their respective furnaces so that the axis, or what constitutes the bore of the gun, shall be in a horizontal position. When the two parts are sufficiently heated, they are swung together by cranes or otherwise, the centralizing pin E having been first inserted in the bore of the partially-formed gun, and the sectional ring having been slipped on over the pin to keep the line of bore as straight as possible. When thus placed together, a horizontal hammer or ram, F, is brought up with force, and by repeated blows welds the section to the partially-formed gun, and so on until the proper length is attained. After each section is welded on, and before the next one is brought up, a countersunk die or tool, G, is placed against the end of the last-welded section, and the ram F brought up against it, so as to give said end a convex form, and so that when the next section is brought up against it the two will be in contact only at or near the bore of the gun, and the welding commence at that point first and continue toward the perimeter, thus driving out all cinder, scale, or impurities from the joint to be welded together and allowing the whole weld to be "metal and metal" and have no intervening impurity.

The gun is made without trunnions. These I propose to screw in after the gun is turned off to its proper shape and form.

When the sections are all welded on, the porter-bar A is cut off, and can be again reused, and the gun is then turned or worked down to its desired form and bored out, as shown by the drawing Fig. 3.

Having thus fully described my invention, what I claim therein as new, and desire to secure by Letters Patent, is—

1. In a wrought-iron gun composed of a series of concentric rings welded together and to the plates forming the breech of the gun, the turning or planing of the contact-surfaces thereof before welding, so as to have them scaled and clean to insure perfect welding, substantially as described.

2. In a wrought-iron gun composed of a series of concentric rings welded together, the so shaping of one of the end surfaces that is to be welded to the next adjacent end surface, as that they shall first unite at or near the bore, and thence be welded toward the perimeter, substantially as and for the purpose described.

3. As an auxiliary in the making of a wrought-iron gun composed of a series of concentric rings welded together, a portable and removable centering-pin, for the purpose of matching the sections as they are put together, and for keeping the bore of the gun as nearly central and straight as possible, substantially as described.

4. A wrought-iron gun composed mainly of a series of concentric rings that are fitted and lap-and-butt welded together, substantially as described.

HORATIO AMES.

Witnesses:
R. H. EDDY,
F. P. HALE, Jr.